July 12, 1966  R. B. WALLACE  3,259,928
APPARATUS AND METHOD OF LONGITUDINALLY SLOTTING THREADED BLANKS
Filed June 20, 1963  2 Sheets-Sheet 1
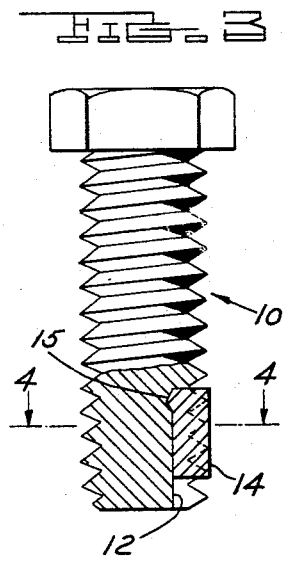
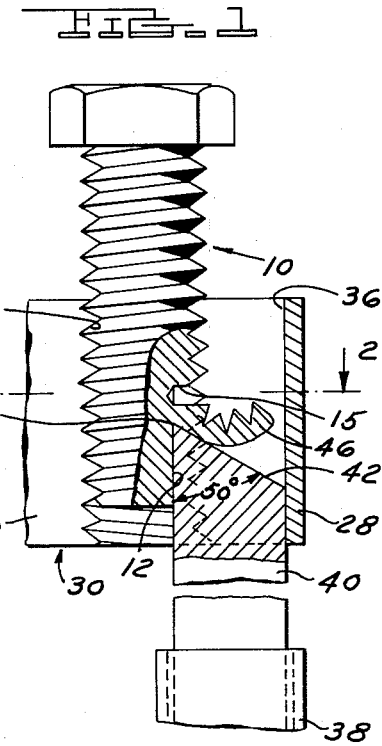
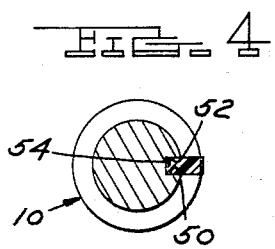
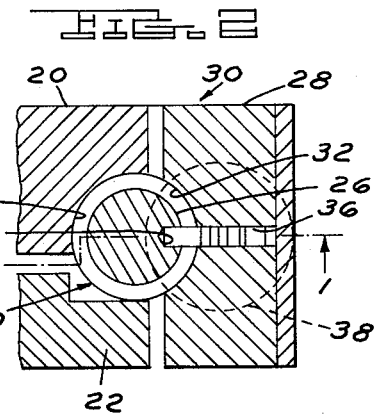
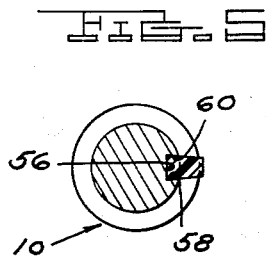
INVENTOR.
RICHARD B. WALLACE
BY Whittemore, Hulbert
& Belknap
ATTORNEYS

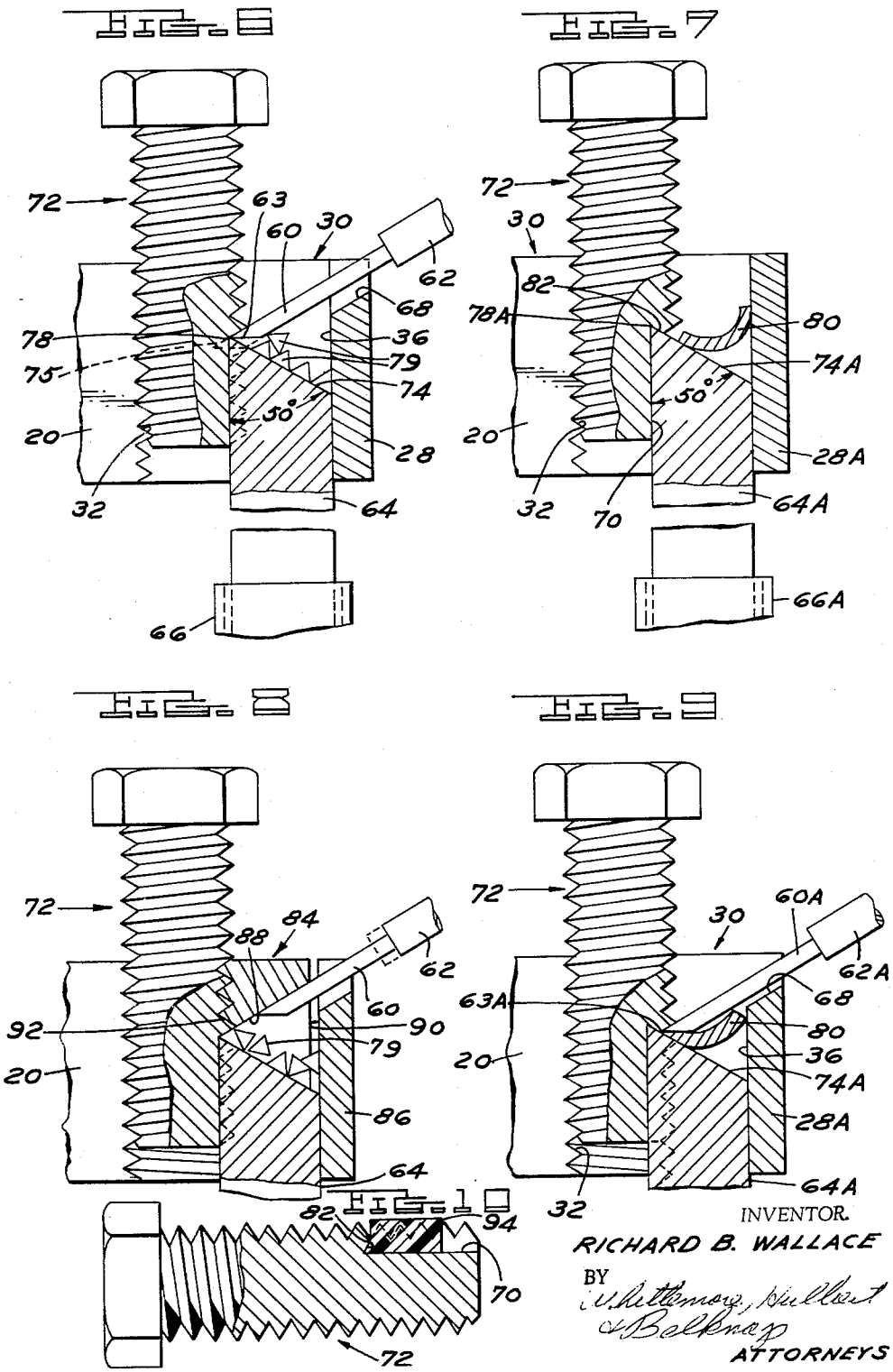

United States Patent Office 3,259,928
Patented July 12, 1966

3,259,928
APPARATUS AND METHOD OF LONGITUDINALLY SLOTTING THREADED BLANKS
Richard B. Wallace, Bloomfield Hills, Mich., assignor to The Oakland Corporation, Birmingham, Mich., a corporation of Michigan
Filed June 20, 1963, Ser. No. 289,287
24 Claims. (Cl. 10—2)

The present invention relates to self-sealing, self-locking, threaded fasteners and to a method and apparatus for making same.

More specifically, the present invention relates to the production of self-sealing, self-locking threaded fasteners in which a plastic plug is permanently secured in a recess or slot provided in the threaded part to extend outwardly therefrom to lock and seal with a cooperating threaded member.

It is an object of the present invention to provide an improved threaded bolt or screw and to the method and apparatus for producing such a device by an operation which includes recessing one side of the threaded fastener by the application of a cutting force applied through a recessing tool which is moved substantially parallel to the axis of the fastener from the leading end towards the trailing end thereof to thereby form an axially extending outwardly opening recess or slot in the threaded fastener.

More specifically, it is an object of the present invention to provide a method and apparatus as described in the preceding paragraph in which the recessing operation is followed by a second cutting operation, through the application of a cutting tool, which is effective to completely sever the strip of material removed from the recess or slot during the recessing operation.

It is a further object of the present invention to provide a method and apparatus in which the threaded fasteners is firmly supported in a thread conforming support or die to prevent or control local distortion of the threads adjacent the threaded recess in the die.

A still further object of the present invention is to provide a method and apparatus as described in a preceding paragraph wherein the die has an opening therein extending axially of the fastener adjacent the circumference thereof and wherein the recessing tool is moved through the opening in the die to form the recess or slot in the fastener.

Another object of the present invention is to provide a method and apparatus wherein the threaded fastener is provided with a radially extending hole intermediate the ends thereof prior to recessing the fastener whereby the strip of material removed from the fastener during the recessing operation is separated from the fastener upon the intersection of the recess or slot with the hole in the fastener.

Still another object of the present invention is to provide a method and apparatus of the aforementioned type wherein the recessing tool is designed to fit closely within the opening in the die and may be of various shapes and configurations, as an example of trapezoidal cross-section, so as to form the recess or slot in the fastener to a like configuration.

A further object of the present invention is to provide a method of forming a slot in an elongated threaded fastener for the reception of a lock plug which comprises mounting a recessing tool adjacent the leading end of the fastener opposite the root diameter thereof for movement in a path which is substantially parallel to and spaced from the axis of the fastener, moving the recessing tool through the leading end of the fastener towards the trailing end thereof a distance corresponding to the length of the slot so as to cut off portions of the threads in individual chips, withdrawing the recessing tool, mounting a cutting tool or blade opposite a point corresponding to the trailing end of the slot for movement in a path substantially following the angle of the threads, moving the cutting tool towards the axis of the fastener to slit the fastener to a depth corresponding to the final depth of the slot, withdrawing the cutting tool, and moving a recessing tool through the leading end of the fastener towards the slit to remove the material therebetween and complete the slot in the fastener.

A still further object of the present invention is to provide an apparatus for producing recesses in previously threaded fasteners which comprises a die having a threaded recess to conform to the threads of a fastener received therein, and an opening in the die extending parallel to the axis of the threaded recess and in communication with the recess, and a recessing tool movable in the opening parallel to the axis of the threaded recess and adapted to cut material from the fastener to form a recess or slot therein.

Another object of the present invention is to provide an apparatus of the aforementioned type wherein a cutting tool is mounted independently of the recessing tool and is movable through the threaded recess in the die in a direction transverse to the axis of the threaded recess substantially following the angle of the threads for forming a slit in the threaded fastener.

Still another object of the present invention is to provide an apparatus wherein the cutting tool is located in the die at a point opposite the trailing end of the slot for applying a pinching force to the fastener during the operation of the recessing tool, whereby the pinching force is effective to sever the strip of material removed from the slot by the recessing tool.

A further object of the present invention is to provide a slotted threaded bolt or fastener wherein the inner end of the slot is undercut to facilitate the gripping of the plastic material therefor.

It is thus another object of the present invention to provide a simplified low cost threaded fastener, method, and apparatus of the aforementioned types having certain advantages contributing to efficiency, reliability and long life as well as ease of maintenance.

Other objects and features of the invention will become apparent as the description proceeds, especially when taken in conjunction with the accompanying drawing, illustrating preferred embodiments of the invention, wherein:

FIGURE 1 is a fragmentary sectional view taken on the line 1—1 of FIGURE 2 and illustrating one embodiment of the apparatus of the present invention.

FIGURE 2 is a sectional view taken on line 2—2 of FIGURE 1.

FIGURE 3 is a side view, partly in section, of the finished bolt or screw.

FIGURE 4 is a sectional view taken on line 4—4 of FIGURE 3.

FIGURE 5 illustrates a modification of the finished bolt taken on the line 4—4 of FIGURE 3 and in a greatly exaggerated condition for clarity.

FIGURE 6 is a side view, partly in section, of another apparatus for recessing a threaded fastener and illustrating the first of two steps required to form the slot in the fastener.

FIGURE 7 is a view similar to FIGURE 6, and illustrating the second step required to form the slot in the fastener.

FIGURE 8 is a side view, in section, of still another apparatus and illustrating the first of two steps required to form the slot in the fastener.

FIGURE 9 is a side view, in section, of still another apparatus, for forming a slot in the fastener.

FIGURE 10 is a side elevation of a finished threaded bolt, partly in section, constructed according to the embodiments illustrated in FIGURES 6–9.

Referring now to the drawings, there is shown in FIGURE 3, a threaded fastening element 10 in the form of a screw or bolt having an elongated outwardly opening axially extending recess or slot 12 at the leading end thereof in which is received an elongated plug or strip 14 of a suitable plastic material. Excellent results are obtained when the plastic plug is formed of nylon. The plug 14 is inserted into the slot 12 under pressure so that a portion thereof projects outwardly beyond the confines of the recess 12.

When the screw or bolt 10 is received in a nut or threaded recess the protruding plastic material 14 is caused to flow and fill and seal the space between the threads of the threaded elements. This effectively prevents leakage which might occur in the helical path of the engaged threads. The most important function, however, of the plug 14 is to provide a frictional interlock which retains the threaded elements in assembled relation. Prior to forming the recess or slot 12 a radially extending hole 15 is drilled in the fastener 10 intermediate the ends thereof for a purpose to be hereinafter described.

In the past, recesses have been provided in threaded fasteners usually by drilling, punching, or by the use of rotary saws. In accordance with the present invention the slot 12 is provided in the previously threaded part in a novel manner and with a unique apparatus designed specifically for this purpose. Since the forming operations are carried out on a previously threaded part it is necessary to confine the threaded fastener 10 in a die which is designed to avoid unacceptable thread distortion.

The present invention may be utilized with the apparatus or machine described in the Wallace et al. United States Patent 2,980,928 entitled "Apparatus for Applying Locking Plugs of Plastic Material to Threaded Articles," issued April 25, 1961 and which is assigned to the assignee of the present invention. It should, of course, be understood that the present invention may be utilized with other types of plug inserting machines.

The machine as described in Patent 2,980,928 is provided with a frame having a rotary index table thereon. A plurality of relatively movable work clamping members or jaws are mounted on the index table. Means are provided for indexing the table in step by step sequence through a plurality of work stations such as a loading station, where the bolts or threaded fasteners 10 are hopper fed into the clamping members, drilling station (if required), brushing station, air cleaning station, plug inserting station and unloading station. It should of course be appreciated that any number of work stations may be utilized in order to modify a previously threaded bolt as will subsequently appear. The tools and equipment required for performing the various work operations at said stations are mounted on the frame about the periphery of the index table.

Referring now to FIGURES 1 and 2 a pair of relatively movable threaded clamping jaws or clamping members are designated by the numerals 20 and 22 and cooperate to define a substantially semi-cylindrical threaded cavity 24. The jaws 20 and 22 are appropriately mounted on the index table for relative movement. As an example, one jaw or clamp member may be stationary and the other jaw or clamp member may be mounted for oscillation about the axis of a pivot mounting member as described in said patent. Each pair of jaws provided on the index table may receive a bolt 10 from a supply hopper when the jaws are at the loading station. The jaws 20 and 22 are arranged to carry the bolt 10 in a substantially vertical position as illustrated in the drawings.

The bolt 10 is held by the relatively movable jaws 20 and 22 such that the outer portion 26 thereof is exposed beyond the confines of the jaws. This is a slight departure from the teaching of said patent. After the threaded jaws 20 and 22 have threadedly gripped the bolt 10, the table is indexed to a recessing station at which time the slot 12 is formed therein.

The recessing station includes a form or tool guide 28 which is threaded to conform to the threads on the exposed portion 26 of the bolt 10 as best illustrated in FIGURE 2. The tool guide 28 is controlled and operated by a power-operated device not shown. The jaws 20 and 22 and the power-operated tool guide 28 cooperate to form a die 30 having a threaded recess 32 for holding the threaded fastener or bolt 10.

It should be noted that the jaws 20 and 22 and the tool guide 28 are spaced apart when in an assembled position to insure adequate pressure threaded engagement between the die parts and the threaded fastener 10. With such a construction the bolt 10 is held by the relatively movable jaws 20 and 22 such that the outer portion 26 is exposed. Thereafter, when at the recessing station, the tool guide 28 is powered in a direction to move in against the exposed portion 26 of the bolt 10 causing the bolt to move up or down in the jaws 20 and 22 to effect full thread mating of the bolt 10 and the tool guide 28. At such time the die parts are clamped or secured in place.

The tool guide 28 is provided with an elongated straight through opening 36 which extends through the tool guide 28 substantially parallel to the axis of the threaded fastener 10 and in communication with the threaded recess 32. The frame of the machine has a power cylinder 38 mounted thereon at the recessing station which is operatively connected to a plow or recessing tool 40. The power cylinder 38 may, as an example, be operated pneumatically and take the form of a piston-cylinder device. The plow 40 has a front face 42 inclined at approximately 50° and is adapted to fit closely within the recess 36. The face is inclined to provide positive rake, as seen in FIGURE 1. The plow 40 is mounted so as to be moved by the power cylinder 38 through the opening 36 in a direction substantially parallel to the longitudinal axis of the threaded fastener 10. The plow 40 is mounted directly opposite the leading end of the threaded fastener 10 and is designed to cut the elongated slot 12 in the threaded fastener 10. Initially, the inner edge 44 of the cutting surface 42 engages the leading end of the threaded fastener 10 and thereafter the strip of material 46 removed from the slot 12 is turned and moved upwardly by the cutting surface 42 during the advancement of the plow 40. The extent of the slot 12 is determined by the intersection thereof with the radially extending hole 15 previously described. As soon as the plow 40 arrives at the hole 15, the clip or strip 46 breaks free. After the slot has been finished the tool guide 28 is moved in the opposite direction away from the bolt 10.

Later the table is indexed through the subsequent work stations and finally through the plug inserting station where the plug 14 is inserted into the slot 12 under pressure so as to completely fill the slot 12 and hole 15. Thereafter the table is indexed to the unloading station where the jaws 20 and 22 are moved apart to permit the finished bolt to be discharged into a hopper.

It should be noted that in FIGURE 4 the side walls 50 and 52 of the slot 12 are substantially straight with the bottom wall 54 being perpendicular thereto. In certain instances, it is highly desirable to utilize a plow 40 of trapezoidal cross-section so as to form a slot 56 of like cross-section, as best illustrated in FIGURE 5, in greatly exaggerated condition for clarity. In such a case, as the plow 40 is moved from the leading end of the fastener 10 towards the rear thereof, the plow 40 resiliently forces the side walls 58 and 60 of the slot 56 circumferentially apart to permit the strip of material to curl outwardly away from the fastener 10. After the plow 40 has been removed from the slot 56 the walls 58 and 60 thereof spring back and assume the position illustrated in FIGURE 5. Alternatively of course, removal of the chip is facilitated by more or less compression or distortion of the chip itself. As an example, the walls 58 and 60 may have an inverse taper of less than one degree. In the past in order to obtain such tapers it was necessary to utilize a rotary saw and mount the saw on two different spindle axes. This however, is not desirable since the saws are subjected to considerable wear, particularly on second cuts.

FIGURES 6 and 7 illustrate another method and apparatus for forming the elongated slot in a threaded fastener and has certain economical advantages over the embodiments illustrated in FIGURES 1–5 in that no hole 15 need be drilled in the fastener as will subsequently appear.

FIGURES 6 and 7 illustrate two separate recessing operations provided at two consecutive recessing work stations on the machine. The apparatus utilizes substantially the same die 30 at the first recessing station (FIGURE 6) as described in connection with FIGURES 1 and 2 with the exception that the tool guide 28 has been slightly modified as will subsequently appear. The apparatus at the first recessing station includes a chisel-like cutting tool or blade 60 which is powered by a fluid motor 62 in a certain sequence with respect to the main blade or plow 64 which is energized by a fluid motor 66.

The plow 64 is mounted on the machine adjacent the leading end of the fastener and opposite the root diameter thereof for movement in a path which is substantially parallel to and spaced from the axis of the fastener.

The cutting tool 60 is actuated independently of the plow 64 and is provided with a cutting edge 63. The cutting tool 60 is adapted to be moved through a slot 68 provided in the upper end of the tool guide 28 into the threaded cavity 32 after the plow 64 has been actuated to perform its recessing function and then returned to a retracted position. The plow 64 has a cutting surface 74 at approximately a 50° angle.

With the cutting tool or blade 60 in a retracted position and the tool guide 28 in threaded engagement with the bolt 72 carried by the jaws 20 and 22, the fluid motor is energized so as to move the plow 64 into the fastener in a direction parallel to the axis of the bolt 72 and at a depth conforming to the root diameter of the bolt 72. As a result thereof the cutting edge 78 on the plow 64 cuts the portions of the threads of the bolt 72 which it contacts and forms individual relatively small chips 79. The extent to which the plow 64 is moved into the threaded bolt 72 is determined by certain stop abutment means not illustrated on the machine. In other words, the plow 64 is moved into the bolt 72 a predetermined distance substantially corresponding to the length of the slot to be formed in the bolt 72.

Thereafter, the plow 64 is returned to its retracted position by the fluid motor 66 after which time the fluid motor 62 is energized so as to move the cutting blade 60 toward the axis of the threaded bolt 72 along a path substantially following the angle of the threads on the bolt. The cutting edge 63 of the tool 60 is moved into the interior of the bolt a distance corresponding to the final depth of the slot to be formed in the bolt 72. In other words, the cutting tool 60 forms a slit 75 in the bolt 72. The inward movement of the blade 60 is limited by certain stop abutment means, not illustrated, carried by the machine. Thereafter, the cutting tool 60 is returned to a retracted position by the fluid motor 62 after which time the tool guide 28 is removed from the jaws 20 and 22 by fluid motor or the like not illustrated.

Upon completion of the various steps just described the work table on which the jaws 20 and 22 are mounted is indexed to the second recessing work station illustrated in FIGURE 7. The second recessing station includes a tool guide 28A, plow 64A and fluid motor 66A. The tool guide 28A is power operated by means not illustrated and is designed to be moved into threaded engagement with the threaded bolt 72 as described in connection with the other embodiments.

The plow 64A and the fluid motor 66A are mounted on the machine with the cutting surface 74A and the cutting edge 78A adjacent the leading end of the bolt 72 at a depth corresponding to the depth of the slot to be subsequently formed. Upon energization of the fluid motor 66A the plow 64A is moved through the fastener parallel to the axis thereof so as to intersect the slit 75 which was formed at the first recessing work station. As a result of the intersection of the plow 64A with the slit 75 the strip of material 80 is severed from the bolt 72. Thereafter, the plow 64A is further advanced slightly beyond the end of the slot 70 to form the undercut 82. The cutting edge 78A on the plow 64 forms the undercut 82 without deforming any of the threads on the bolt 72. The undercut 82 is designed to help hold the plastic plug in the slot 70. Stop abutment means not illustrated are carried by the machine for limiting the advancement of the plow 64A. After the undercut 82 has been formed the plow 64A and tool guide 28A are moved to their retracted positions. Later the index table of the machine is advanced to the plug inserting station and then to the unloading station as described in connection with FIGURES 1 and 2.

It should be noted that the second recessing work station shown in FIGURE 7 does not utilize a cutting blade 60 or fluid motor 62. The first station is designed to sever portions of the threads of the bolt 72 into individual chips 79 while the second work station is designed to complete the slot by the removal of the strip of material 80.

While FIGURES 6 and 7 relate to the formation of the slot 70 in two steps performed at two recessing work stations, it should be understood that in certain applications it may be desirable to perform both steps at one recessing station. As an example, the apparatus illustrated in FIGURE 6 should be utilized and in addition means, not shown, would be provided for the lateral shifting of the plow 64 after the slit 75 has been formed in the bolt 72.

Referring now to FIGURE 8, a modified die 84 is utilized which is similar to die 30 with the exception that the tool guide 86 is of a different design. The jaws 20 and 22 are of the same construction. The tool guide 86 is power operated in the same manner as tool guide 28 and includes a downwardly and inwardly sloping wall or surface 88 at the upper end of the slot 90. The tool guide 86 is threaded as indicated by the numeral 92 so as to conform to the exposed threaded portion on the bolt 72. The wall 88 serves as a guide surface for the cutting tool 60 during movement thereof. Both the wall 88 and tool 60 are arranged on an angle substantially corresponding to the angle of the threads on the bolt 72. The plow 64 and cutting tool 60 are energized according to the sequence described for FIGURE 6 to initially cut the chips 79 and form the slit 75. Later the table is indexed to the second recessing work station where the strip of material is removed from the slot as described in the description of FIGURE 7.

The embodiment illustrated in FIGURE 9 utilizes substantially the same apparatus as shown in FIGURE 6 but is operated in a different manner. Identical apparatuses are utilized at both recessing work stations. In other words, each recessing work station includes a power operated tool guide, cutting tool and plow.

At the first recessing work station in cutting tool 60 is adapted to be moved through the slot 68 provided in the upper end of the tool guide 28 into the threaded cavity 32 such that the cutting edge 63 firmly engages the material at the root of the threads at a point corresponding to the back end of the slot 70 of the bolt 72. Thereafter the fluid motor 66 is energized so as to move the plow 64 in a direction parallel to the axis of the bolt 72 and at a depth conforming to the root diameter of the bolt 72. As a result thereof the cutting edge 78 of the plow 64 cuts the portions of the threads of the bolt 72 which it contacts to thereby form individual relatively small chips 79 as mentioned previously in connection with FIGURE 6. The limit of the cutting action is determined by the engagement of the plow 64 with the cutting tool 60 or other stop means may be utilized to limit the stroke of the plow 64.

The plow 64, cutting tool 60 and tool guide 28 are moved to their retracted positions after which time the bolt 72 is advanced to the second of the two recessing work stations as illustrated in FIGURE 9. After the tool guide 28A has been moved in against the threaded bolt 72, the cutting tool 60A is moved to the position illustrated in FIGURE 9, with the cutting edge 63 at the root of the threads.

The plow 64A is then actuated by the fluid motor 66A and moved thereby through the leading end of the fastener 72 in a direction parallel to the axis thereof. As the plow 64A advances, the strip of material 80 removed from the slot 70 is likewise advanced upwardly by the cutting surface 74A on the plow 64A. The strip 80 is severed from the fastener 72 as the plow 64A reaches the final length of cut as illustrated in FIGURE 9 due to the cutting edge 63A provided on the tool 60A. In other words, as the plow 64A advances, the tool 60A pinches the material corresponding to the inner end of the slot 70 so as to cut or sever the strip 80. In the event the strip 80 is not severed by the pinching action of the tool 60A, the plow 64A is withdrawn and thereafter the fluid motor 62A is energized to move the cutting tool 60A towards the axis of the bolt 72 to complete the severance of the strip 80.

After the strip 80 has been removed the plow 64A is advanced to form the small undercut 82 in the bolt 72 at the closed end thereof. The undercut 82 is designed to help hold the plastic plug in the slot 70 as mentioned in connection with FIGURE 7.

Upon the severance of the strip 80 the cutting tool 60A, plow 64A and tool guide 28A are withdrawn or returned to their retracted positions. Subsequently, the table is indexed to the plug inserting station and then to the unloading station as described in connection with FIGURES 1 and 2.

Alternately, the steps illustrated in connection with FIGURE 9 may be performed by two separate recessing operations provided at one recessing station. With such a construction it is necessary to advance the plow transversely towards the axis of the bolt 72 between the two recessing operations of the plow.

FIGURES 7, 9 and 10 illustrate the undercut 82 at the closed end of the slot 70. After the slotting operation has been completed the table is indexed through various work stations and finally through the plug inserting station where an elongated strip of plastic material 94 is inserted under pressure into the elongated slot 70 with part of the material filling the undercut 82 as best illustrated in FIGURE 10. Finally the table is indexed to the unloading station.

It is important to note that the cutting tool 60A will not advance to complete the severing operation, if required, until the plow 64A has been moved to its retracted position.

The invention described herein has many advantages. By utilizing the plow, a slot may be placed in the threaded fastener which is of variable width and depth with no restrictions from material flow as is the case in a punching operation. In addition, the cost of the plow and cutting tool is considerably less than the tools required in a milling or sawing operation.

In addition, various shapes of the plow can produce locking ridges for the plastic material. After a certain period of use the plow is dressed to the original configuration. By utilizing the dies of the present invention it has been found that no deformation of the screw or thread diameters takes place as is the case with a punching operation.

As previously mentioned, the plow may be shaped to provide an inverse taper on the slot of the fastener without requiring the use of a rotary saw or punch blade. In the case of a rotary saw it was required to take two cuts on different spindle axes. The plow and cutting tool are relatively inexpensive to manufacture and may be maintained economically. In addition, it has been found that the operation as described herein may be performed faster than utilizing the saw as taught in the prior art.

Another important advantage of the present invention is that the plow loads are absorbed by the thread form of the die, tending to cancel out such loads at the point of forming the slot rather than involving the entire machine structure as is required with a punch.

While the present invention illustrates a means for installing an extended strip of plastic material it does not preclude the use of a "strip" of cylindrical configuration.

It should be understood that the amount of undercut 82 at the closed end of the slot 70 provided in the threaded fastener 72 may be varied by changing the slope of the surface 74 on the plow 64 or by changing the angle of the cutting tool 60. The slot 70 may have parallel side walls similar to the walls illustrated in FIGURE 4 or inclined side walls similar to the inclined side walls illustrated in FIGURE 5. The various modifications include the undercut 82.

The cutting surface 74 on the plow 64 is illustrated as having an angle of approximately 50 degrees while the sloping wall 88 and cutting tool 60 are arranged on approximately a 60 degree angle so as to conform to the angle of the threads on the fastener 72.

The drawing and the foregoing specification constitute a description of the improved fastener and a method and apparatus for producing the threaded fastener in such full, clear, concise and exact terms as to enable any person skilled in the art to practice the invention, the scope of which is indicated by the appended claims.

What I claim as my invention is:

1. Apparatus for producing elongated recesses in previously threaded fasteners which comprises a die having a threaded recess to conform to the threads on a fastener received therein, and an opening in the die extending parallel to the axis of the threaded recess and in communication with the recess, and an elongated plow-like recessing tool having a single cutting edge at its leading end movable in said opening parallel to the axis of said threaded recess and adapted to cut material from the fastener to form a recess therein.

2. Apparatus as defined in claim 1 in which said recessing tool is an elongated blade of generally rectilinear cross-section, an inclined front surface forming a single cutting edge at its intersection with the inner side side of said blade, the inclined front surface providing positive rake to guide the chip formed by advancing the tool laterally out of the recess.

3. Apparatus as defined in claim 2 in which the sides of said blade are parallel and the spacing therebetween determines the width of the recesses.

4. Apparatus as defined in claim 2 in which the sides of said blade converge inwardly at a small angle from the side at which the cutting edge is located to form a slot having outwardly converging side walls.

5. Apparatus for producing elongated recesses in previously threaded fasteners which comprises a die having a threaded recess to conform to the threads on a fastener received therein, and an opening in the die extending parallel to the axis of the threaded recess and in communication with the recess, and an elongated plow-like recessing tool having a single cutting edge at its leading end movable in said opening parallel to the axis of said threaded recess and adapted to cut an elongated strip of material from the fastener and to turn the strip of material rearwardly as the tool is advanced in the same direction to form an elongated recess in the fastener.

6. Apparatus for producing elongated recesses in previously threaded fasteners which comprises a two part die having a threaded recess to conform to the threads on a fastener received therein, and an opening in the die extending parallel to the axis of the threaded recess and in communication with the recess, and an elongated plow-like recessing tool having a single cutting edge at its leading end movable in said opening parallel to the axis of said threaded recess and adapted to cut material from the fastener to form a recess therein.

7. Apparatus for producing elongated recesses in previously threaded fasteners which comprises a die having a threaded recess to conform to the threads on a fastener received therein, and an opening in the die extending parallel to the axis of the threaded recess and in communication with the recess, a recessing tool movable in said opening parallel to the axis of said threaded recess and adapted to cut material from the fastener to form a recess therein, and a cutting tool mounted independently of said recessing tool movable through said die in a direction transverse to the axis of said threaded recess and adapted to sever the strip of material from the fastener.

8. The apparatus defined in claim 7 wherein said tools are each operated by a power cylinder.

9. The apparatus defined in claim 7 wherein said die includes a transversely extending guide surface at the rear of said opening for guiding said cutting tool during operation thereof.

10. The method of forming a slot in an elongated threaded fastener for the reception of a lock plug which comprises holding the fastener in a substantially stationary position, mounting a recessing tool opposite the leading end of the fastener near the circumference thereof for movement in a path which is substantially parallel to and spaced from the axis of the fastener, moving the recessing tool through the leading end of the fastener into the interior thereof so as to cut an elongated axially extending outwardly opening slot in the fastener and to simultaneously turn the strip of material removed from the slot into the path of movement of said recessing tool, mounting a cutting tool opposite the trailing end of the slot for movement in a path transverse to the axis of said fastener, and moving the cutting tool towards the axis of the fastener to sever said strip from said fastener.

11. The method of forming a slot in an elongated threaded fastener which comprises forming a substantially radially extending hole in the outer surface of the fastener intermediate the ends thereof, supporting the threaded fastener in a die having a thread conforming surface engaging the fastener, the die having an opening therethrough extending axially of the fastener adjacent the circumference thereof, with said hole axially aligned with said opening, and moving a recessing tool through said opening into the leading end of the fastener toward said hole so as to cut an elongated axially extending outwardly opening slot in the fastener and to simultaneously turn the strip of material removed from the slot into the path of movement of said recessing tool until it is severed from the fastener upon the intersection of the slot with the hole.

12. The method of forming a slot in an elongated threaded fastener for the reception of a lock plug which comprises holding the fastener in a substantially stationary position, mounting an elongated plow-like recessing tool having a single cutting edge at its leading end adjacent the leading end of the fastener opposite the root diameter thereof for movement in a path which is substantially parallel to and spaced from the axis of the fastener, moving the recessing tool through the leading end of the fastener towards the trailing end thereof a distance corresponding to the length of the slot so as to cut off portions of the threads of the fastener in individual chips, withdrawing the recessing tool, mounting a cutting tool or blade opposite a point corresponding to the trailing end of the slot for movement in a path substantially following the angle of the threads on the fastener, moving the cutting tool towards the axis of the fastener to slit the fastener to a depth corresponding to the final depth of the slot, withdrawing the cutting tool, mounting the recessing tool adjacent the leading end of the fastener at a point corresponding to the final depth of the slot, and moving the recessing tool through the leading end of the fastener towards the slit to remove the material therebetween and complete the slot in the fastener.

13. The method of forming a slot in an elongated threaded fastener for the reception of a lock plug which comprises holding the fastener in a substantially stationary position, mounting a recessing tool adjacent the leading end of the fastener opposite the root diameter thereof for movement in a path which is substantially parallel to and spaced from the axis of the fastener, moving the recessing tool through the leading end of the fastener towards the trailing end thereof a distance corresponding to the length of the slot so as to cut off portions of the threads of the fastener in individual chips, withdrawing the recessing tool, mounting a cutting tool or blade opposite a point corresponding to the trailing end of the slot for movement in a path substantially following the angle of the threads on the fastener, moving the cutting tool towards the axis of the fastener to slit the fastener to a depth corresponding to the final depth of the slot, withdrawing the cutting tool, mounting the recessing tool adjacent the leading end of the fastener at a point corresponding to the final depth of the slot, moving the recessing tool through the leading end of the fastener towards the slit to remove the material therebetween and complete the slot in the fastener, and thereafter advancing the recessing tool towards the trailing end of the fastener to form a small undercut in the fastener below the threads.

14. The method of forming a slot in an elongated threaded fastener which comprises supporting the fastener in a die having a thread conforming surface engaging the fastener, the die having an opening therethrough extending axially of the fastener adjacent the circumference thereof, mounting a cutting tool for movement in a path substantially following the angle of the threads on the fastener, moving the cutting tool into engagement with the fastener at the root diameter thereof and at a point corresponding to the trailing end of the slot, moving a recessing tool through the opening into the leading end of the fastener to cut an elongated axially extending outwardly opening slot in the fastener and to simultaneously turn the strip of material removed from the slot into the path of movement of said recessing tool whereby the strip is severed due to the pinching action of the cutting tool.

15. The method of forming a slot in an elongated threaded fastener which comprises supporting the fastener in a die having a thread conforming surface engaging the fastener, the die having an opening therethrough extending axially of the fastener adjacent the circumference thereof, mounting a cutting tool for movement in a path substantially following the angle of the threads on the fastener, moving the cutting tool into engagement with the fastener at the root diameter thereof and at a point corresponding to the trailing end of the slot, moving a recessing tool through the opening into the leading end of the fastener to cut an elongated axially extending outwardly opening slot in the fastener and to simultaneously turn the strip of material removed from the slot into the path of movement of said recessing tool whereby the strip is partially severed due to the pinching action of the cutting tool, and moving the cutting tool towards the axis of the fastener to completely sever the strip from the fastener.

16. The method of forming an elongated slot in the side of an elongated threaded element such as a bolt or screw commencing at a threaded end of such element and terminating with a closed end at a point in the threaded portion of such element, which comprises positioning adjacent the entering end of the threaded element an elongated substantially flat blade having a width corresponding approximately to the desired width of slot and having its end surface adjacent the entering end of said element inclined to produce a sharp cutting edge at the inner edge of the end surface thereof, relatively moving said element and blade in a direction to cause the cutting edge of said blade to have relative movement longitudinally of the element to cut a slot therein, the path of movement of the cutting edge of said blade being substantially tangent to the root of the thread on the element to remove a multiplicity of chips each being formed from one convolution of thread.

17. The method of claim 16, comprising the additional steps of thereafter withdrawing the blade axially of the element, and taking a second cut with the path of the cutting edge below the roots of the thread convolutions on said element to remove a single chip therefrom.

18. The method of claim 22, comprising the additional step of moving a second chisel-like tool transversely into said element to sever the chip raised by said plow-like tool.

19. The method of claim 18, comprising the additional step of thereafter relatively moving said element and plow-like tool further in the first described relative movement to form an undercut recess at the end of the slot.

20. The method of forming a recess in an elongated threaded fastener which comprises forming a transversely extending hole in the outer surface of the fastener intermediate the ends thereof, supporting the threaded fastener in a die having a thread conforming surface engaging the fastener, the die having an opening therethrough extending axially of the fastener adjacent the circumference thereof, with said hole axially aligned with said opening, and moving a recessing tool through said opening into the leading end of the fastener towards said hole so as to remove the material therebetween and form an axially extending outwardly opening recess therein which extends from the leading end of the fastener to the aforesaid hole.

21. The method as defined in claim 20 which comprises the additional step of continuing movement of the recessing tool into the material beyond the transversely extending hole to form an undercut surface at the end of the recess.

22. The method of forming an elongated slot in the side of an elongated threaded element such as a bolt or screw commencing at a threaded end of such element and terminating with a closed end at a point in the threaded portion of such element, which comprises positioning adjacent the entering end of the threaded element an elongated substantially flat blade having a width corresponding approximately to the desired width of slot and having its end surface adjacent the entering end of said element inclined to produce a sharp cutting edge at the inner edge of the end surface thereof, relatively moving said element and blade in a direction to cause the cutting edge of said blade to have relative movement longitudinally of the element to cut a slot therein, the path of movement of the cutting edge of said blade being substantially below the roots of the thread convolutions on said element to remove a single chip therefrom.

23. The method of forming an elongated slot in the side of an elongated threaded element such as a bolt or a screw commencing at a threaded end of such element and terminating with an abruptly closed end at a point intermediate the threaded portion of such element which comprises moving a slitting tool transversely of the element to provide a transversely extending cut of a depth at least as great as the depth of the slot, withdrawing the slitting tool, thereafter advancing an elongated recessing tool provided with a single cutting edge located at the leading end thereof longitudinally of the threaded element from the threaded end thereof in a direction parallel to the axis of the element and at a depth to provide a longitudinally extending slot of the required depth, continuing the advance of said recessing tool until its cutting edge intersects the transverse slit, thus freeing the chip produced during advance of the recessing tool.

24. The method as defined in claim 23 in which the leading end of the recessing tool is inclined to provide positive rake to guide the chip as it is formed laterally out of the slot, comprising the additional step of further advancing the tool after severance of the chip to cause the positively raked front face of the tool to shape and undercut the end surface in the threaded element at the end of the slot.

References Cited by the Examiner
UNITED STATES PATENTS

| | | | |
|---|---|---|---|
| 2,409,638 | 10/1946 | Lyon | 151—7 |
| 2,510,835 | 6/1950 | Rice | 29—95.1 |
| 2,740,973 | 4/1956 | Borner et al. | 10—2 |
| 2,913,031 | 11/1959 | McKay et al. | 151—7 |
| 2,956,293 | 10/1960 | McKay et al. | 10—2 |
| 3,099,071 | 7/1963 | Moore | 10—10 |

ANDREW R. JUHASZ, *Primary Examiner.*

EDWARD O. RELLER, *Examiner.*

E. C. ALLEN, *Assistant Examiner.*